No. 695,483. Patented Mar. 18, 1902.
N. F. PALMER.
MACHINE FOR MOLDING ARTIFICIAL STONE.
(Application filed Nov. 18, 1901.)
(No Model.) 2 Sheets—Sheet 1.

Witnesses: Inventor:
Noyes F. Palmer
by his attorneys
Roeder & Briesen

No. 695,483. Patented Mar. 18, 1902.
N. F. PALMER.
MACHINE FOR MOLDING ARTIFICIAL STONE.
(Application filed Nov. 18, 1901.)
(No Model.) 2 Sheets—Sheet 2.
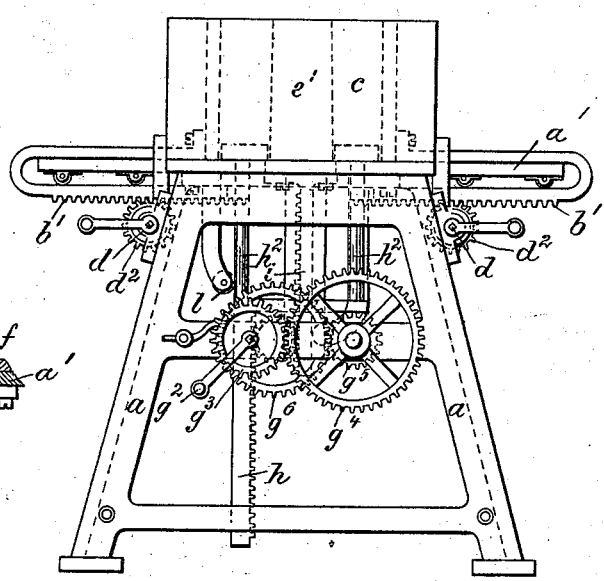
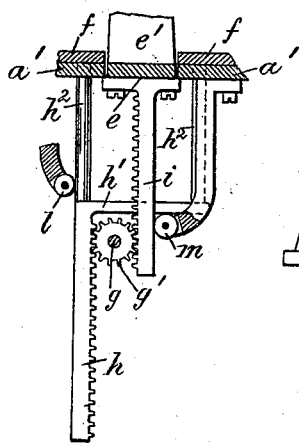
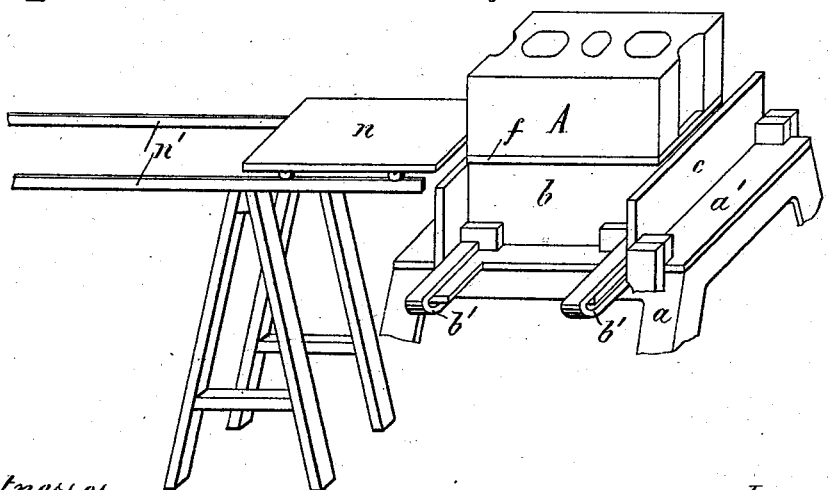
Witnesses: Inventor:

UNITED STATES PATENT OFFICE.

NOYES F. PALMER, OF BROOKLYN, NEW YORK.

MACHINE FOR MOLDING ARTIFICIAL STONE.

SPECIFICATION forming part of Letters Patent No. 695,483, dated March 18, 1902.

Application filed November 18, 1901. Serial No. 82,720. (No model.)

*To all whom it may concern:*

Be it known that I, NOYES F. PALMER, a citizen of the United States, and a resident of Brooklyn, county of Kings, and State of New York, have invented certain new and useful Improvements in Machines for Molding Artificial Stone, of which the following is a specification.

This invention relates to a machine for molding concrete building and paving blocks, and more particularly to means for readily separating and removing the block from the mold.

Figure 1:
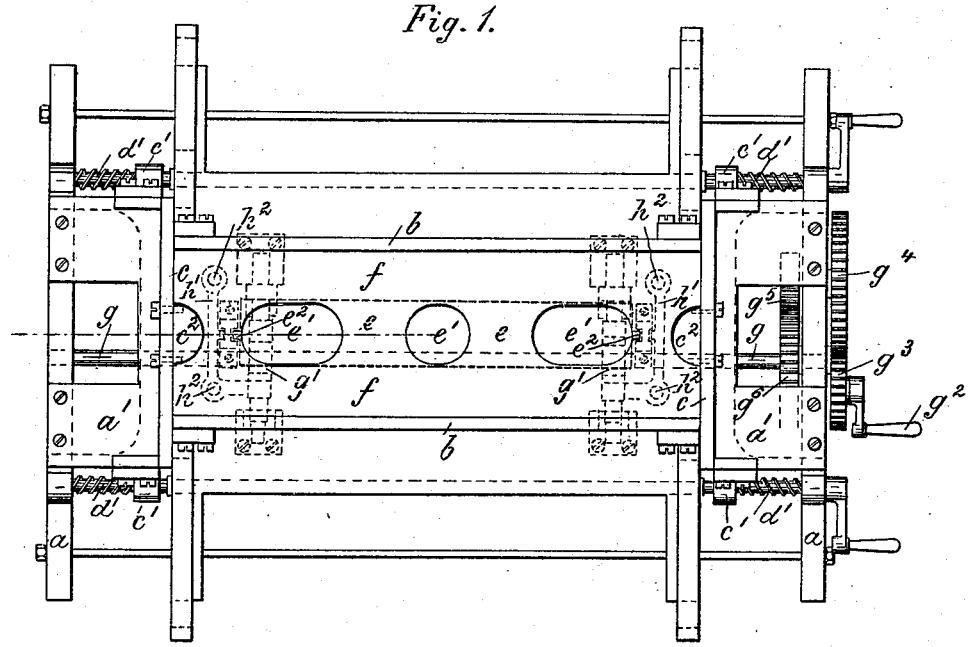
Figure 2:
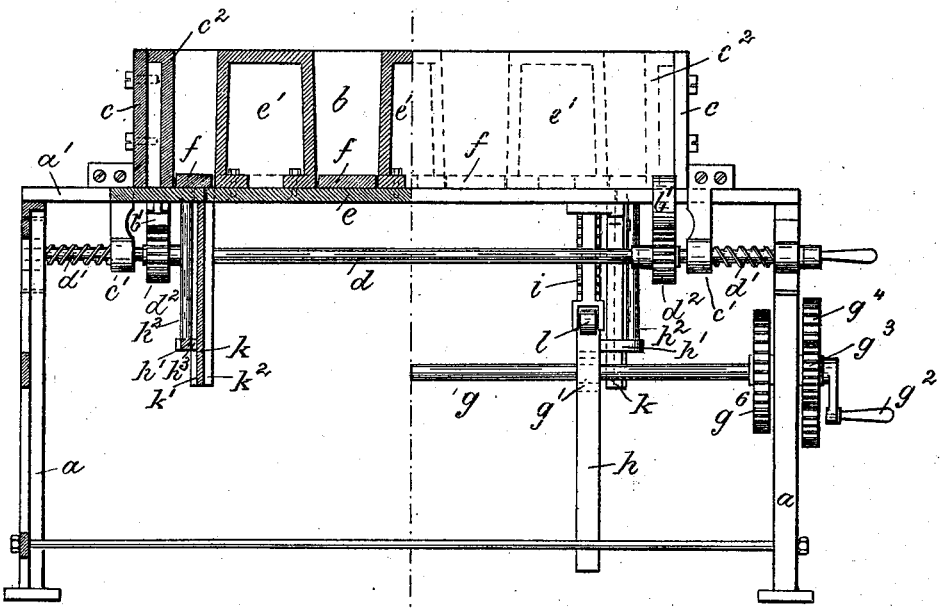

In the accompanying drawings, Figure 1 is a plan of my improved machine for molding artificial stone with the carriage omitted; Fig. 2, a front elevation, partly in section, of the same; Fig. 3, an end view; Fig. 4, a perspective view of the upper part of the machine, and Fig. 5 is a detail of the elevating mechanism.

The letter $a$ represents the frame of the machine, and $a'$ is the fixed bed-plate.

$b\ b$ are the sides, and $c\ c$ the ends, of the mold-box, which are adapted to open and close by sliding upon said plate. The sides and ends are operated by a pair of shafts $d$, provided with worms $d'$ and gear-wheels $d^2$. The worms $d'$ move the end plates $c$ by means of nuts $c'$, while the gear-wheels $d^2$ move the side plates $b$ by means of racks $b'$.

The bed-plate $a'$ is made with a central opening, in which fits a plunger $e$, carrying one or more upwardly-projecting cores $e'$. The drawings show the cores $e'$ secured to the plunger $e$, while two additional cores $c^2$ are secured to the end plates $c$. The cores $e'$ will thus form perforations in the block, while the cores $c^2$ will form surface grooves.

Upon the bed-plate $a'$ is placed a false bottom $f$, which is perforated to accommodate the cores $e'$ and upon which the tamped mass or block is adapted to be supported. In order to readily remove the block after being molded, the false bottom may be raised, so as to elevate the block above the upper edge of the mold-box. At the same time the cores may be depressed, so as to be withdrawn from the mass. The construction for effecting this result is as follows: $g$ is a longitudinal shaft carrying a pair of pinions $g'\ g'$ and rotated by a handle $g^2$ through gearings $g^3\ g^4\ g^5\ g^6$.

The pinions $g'$ are engaged at diametrically opposite points by two racks $h$ and $i$, Fig. 5, which are so arranged that when the rack $h$ is lowered the rack $i$ is raised. The rack $h$ projects from one end of a cross-piece $h'$, provided with two upwardly-extending arms $h^2$, that pass through perforations of the base-plate $a'$ and support the false bottom $f$. The rack $i$ is directly connected to the plunger $e$ or core $e'$.

In order to guide the arms $h^2$ and the plunger $e$ during their up-and-down motion, I provide a pair of rails $k$, that depend from the bed-plate $a'$. These rails are doubly grooved, as at $k'\ k^2$, Fig. 2, the groove $k'$ being engaged by a feather $h^3$ of cross-piece $h'$ and the groove $k^2$ being engaged by a feather $e^2$ of plunger $e$. Idlers $l$ and $m$ hold the racks $h\ i$ in engagement with the pinions $g'$.

In order to remove the molded block from the machine, I provide an elevated carriage $n$, Fig. 4, traveling upon rails $n'$ and adapted to be run alongside the top of the mold-box.

The operation is as follows: After the mold has been adjusted to the size desired the false bottom is inserted and the mass tamped in and struck off. The mold is then opened and the cores lowered, while the false bottom is simultaneously raised by turning the handle $g^2$. When the block $A$ has been lifted to clear the mold, it is transferred, together with the false bottom, to the carriage $n$, and a new false bottom is inserted ready to receive the next charge.

What I claim is—

1. In a machine for molding artificial stone, the combination of a mold-box, with an inclosed core, a perforated false bottom embracing the core, means for raising the false bottom, means for lowering the core, and means for simultaneously operating the false-bottom-raising means and the core-lowering means, substantially as specified.

2. In a machine for molding artificial stone, the combination of a mold-box having sliding sides and ends, with an inclosed core, a perforated false bottom embracing the core, means for raising the false bottom, means for lowering the core, and means for simultaneously operating the false-bottom-raising means and the core-lowering means, substantially as specified.

3. In a machine for molding artificial stone, the combination of a mold-box, with an inclosed movable core, an inclosed movable false bottom, racks for operating the core and false bottom, and pinions engaging the racks, substantially as specified.

Signed by me at New York city, county and State of New York, this 16th day of November, 1901.

NOYES F. PALMER.

Witnesses:
F. V. BRIESEN,
EDWARD RAY.